May 18, 1937. J. N. CAROTHERS Re. 20,367
PROCESS FOR PRODUCING DIPHENYL
Original Filed April 7, 1928
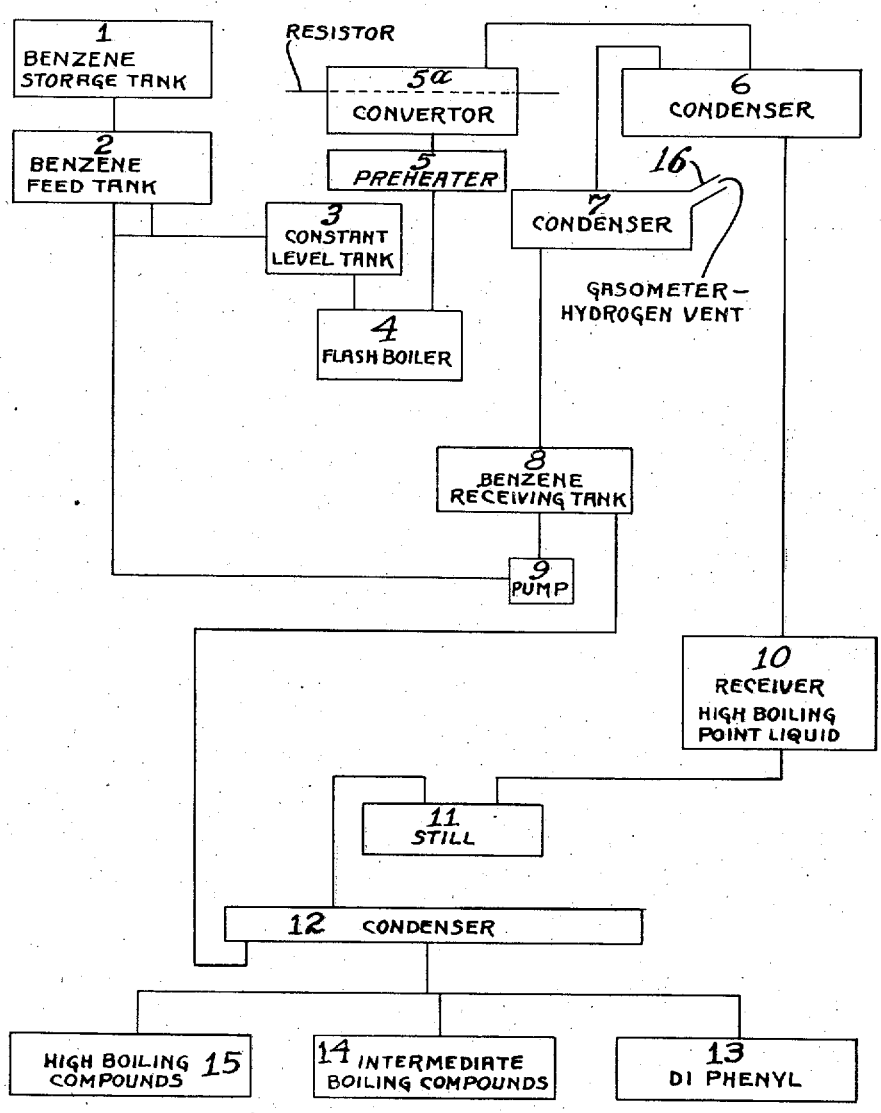
Inventor
J.N.Carothers
By Johnston & Jennings
Attorneys Reissued May 18, 1937

Re. 20,367

UNITED STATES PATENT OFFICE 20,367

PROCESS FOR PRODUCING DIPHENYL

John N. Carothers, Anniston, Ala., assignor, by mesne assignments, to Monsanto Chemical Company, St. Louis, Mo., a corporation of Delaware Original No. 1,875,317, dated September 6, 1932, Serial No. 268,096, April 7, 1928. Application for reissue January 18, 1936, Serial No. 59,695

15 Claims. (Cl. 260—168)

My invention relates to a method for the commercial production of diphenyl from benzene, or the commercially known product, benzol, by the employment of heat to raise the temperature of the benzol to that at which diphenyl is formed, and has for its object the provision of such a process whereby a high yield of diphenyl may be obtained and a high percentage of diphenyl formed during a single pass of benzene vapors over the heated surface.

A further object of my invention is to provide a process for the commercial production of diphenyl from benzol in which benzol vapors are passed over a heated surface to raise them to the temperature at which diphenyl is formed, and wherein objectionable deposits of tar and carbon on the heated surface are practically eliminated.

A still further object of my invention is to provide a process of the character designated for the commercial production of diphenyl from benzol, wherein the unreacted benzol at each pass over the heated surface is recovered and re-treated until it is all reacted upon.

Heretofore, so far as I am aware, diphenyl has only been produced in small quantities in a chemical laboratory. Various methods of diphenyl preparation have been suggested, such as suspending electric heating coils in a flask containing liquid benzene and benzene vapors, or by passing benzene vapor through an externally heated tube. Diphenyl has also been produced by the preparation from solution, such as by adding copper to a solution of diazobenzene sulphate in alcohol, or by heating monobrombenzene or monochlorbenzene with sodium. In such instances where benzene vapors were heated, the rate of flow of the vapors was uncontrolled, and the heating regulation likewise was uncontrolled.

In my investigations of the preparation of diphenyl from benzene, in which the vapors are passed through a hot tube, I have encountered all the difficulties, reported by previous investigators, as regards stopping of the tube with carbon, and the formation of tarry bodies. In such references as I have noted, frequent mention is made of the formation of tar and carbon, and the necessity of frequently cleaning out the tubes when benzene vapors are passed through heated tubes. I have observed that under certain conditions tar is formed and carbon is deposited, and when deposited on the heating surface, greatly reduces the yield of diphenyl from the process. I have discovered a means of preventing such deposition of carbon, and of lowering the quantity of tar or other high boiling compounds which are formed, until their presence is neither an objection to the continuous operation of the process, nor a source of great loss of benzene.

By the method of operation which I employ, I am enabled to control the various factors which I have found it is necessary to have under control, and as a result of this control I am enabled to carry on a commercial operation of this process and obtain a satisfactory yield of diphenyl from the benzene. By satisfactory yield, I mean at least 8% diphenyl in the total condensate after one pass.

Although external means of heating may be applied, and satisfactory results obtained, I have found internal heating, i. e. heating the gas stream by means of metallic resistors with electric current to be more satisfactory. It is obvious that internal heating may be accomplished by induction, instead of by resistance. Further I have found that metallic resistors, rather than non-metallic resistors, are better suited for this purpose. While non-metallic resistors are satisfactory for short periods, the electrical resistance drops very rapidly, and in a short time, such non-metallic resistors as have been tested are unsatisfactory because of this change of resistance. Although other metals may be used as a metallic resistor, I have found that nichrome is very satisfactory. The heating surface may be arranged as desired, according to the form of the material used.

My research in the production of diphenyl has led to the conclusion that the formation of tar and carbon on the heating elements employed for raising the temperature of the benzene vapors, has been largely due to the undue length of time in which these vapors were in contact with the heating element which raises the temperature of the vapors to the reaction temperature at which diphenyl is formed. I have found that if the vapors may be quickly raised to the optimum temperature at which diphenyl is formed, these depositions of tar and carbon do not occur to an extent which is objectionable to the operation of the process. In order to minimize the formation of tar and carbon, I have found that if the vapors be first raised to the highest temperature permissible, without the formation of appreciable quantities of diphenyl, and then suddenly subjected to a surface capable of quickly raising the temperature of the vapors to that at which diphenyl is formed, the time element during which the vapors are in contact with the highly heated surface is greatly reduced and no objectionable deposits of tar and carbon are formed on the highly heated surface. By this method I am enabled to maintain a relatively high velocity over the most highly heated surface so that the vapors pass thereover so quickly that no deposits are formed. Should tarry compounds be formed, the fact that they are forming may be observed by an increase in the flow of hydrogen and other uncondensed gases from the gas outlet of the reaction system.

In order to obtain an increased yield of diphenyl, I have found that, immediately the vapors have reached the reaction temperature, they should be quickly cooled to a temperature considerably below that at which the reaction occurs. The preheating of the vapors followed by the passing of the vapors over a highly heated element at a relatively high velocity to produce the reaction is of material aid in bringing about the quick cooling feature of my process. This, for the reason that at the relatively high velocity the vapors are immediately subjected to a cooling process in a condenser which should be located as near as possible to the converter in which the reaction occurs.

While I do not know the exact extent to which water may be present in commercially pure benzol, without causing trouble in the formation of carbon, nevertheless, I have found water an objection if it is present in such quantities as to separate from the benzol. In view of this observed fact that carbon forms more readily when water is present, than when dry benzol is used, I prefer using water free benzol.

While benzol may be used which is of a grade designated as "90% commercial", I have found that the use of this grade of benzol is not satisfactory where it is sought to obtain diphenyl alone, because of the wide boiling range of the product; and as a result of the presence of other compounds than benzene, lower yields of diphenyl are obtained. Also difficulties are encountered in separating the diphenyl from reaction products of these other compounds.

Benzol designated at "90% commercial" contains certain percentages of other aromatic hydrocarbons, especially toluene and xylene. These hydrocarbons, along with the benzene, when treated in accordance with my improved process, produce complex di-aryl compounds which are the "other compounds" referred to above. For certain purposes, the complex mixture obtained by treating the benzol designated as "90% commercial" in my improved process is superior to pure diphenyl. On the other hand, when diphenyl with a minimum of the complex di-aryl compounds it is to be produced, it is preferable to use a commercial grade of benzol, designated as "commercially pure". This grade of benzol is of sufficient purity and boils within a 2° C. range, which range includes the true boiling point of benzene.

In order that my process may be more readily understood, reference will be had to the accompanying diagrammatic drawing outlining the steps thereof. Liquid benzol is fed from a constant level tank 3 into a flash boiler 4, where the benzol is vaporized and passes to a preheater 5 where it is preheated and then passed into a converter 5a, which is provided with means for heating the vapors to the temperature necessary for the formation of diphenyl according to the following equation:

$$2C_6H_6 + \text{heat} = C_6H_5C_6H_5 + H_2$$

The preheater may be of any approved type and may gradually or quickly raise the temperature of the vapors to the highest point permissible at which no appreciable reactions occur. I have found that a temperature of from 600° to 650° C., is the optimum temperature for practical purposes. Upon leaving the preheater, the vapors pass, at a relatively high velocity, immediately into the converter where they come in contact with a heated surface, which may comprise an electrically heated screen or other suitable surface maintained at a temperature of from 750° to 800° C., the optimum temperature at which diphenyl is formed. The vapors are here raised to a temperature substantially equal to that of the heated surface.

Inasmuch as the vapors, before passing over this surface, have already been raised to a temperature of from 600° to 650° C., there is added only a relatively small amount of heat to the vapors. This being the case, a relatively high velocity of the vapors may be maintained across the heated surface, thus minimizing the occurrence of side reactions and deposits of tar and carbon.

From the converter 5a the mixed vapors of benzol, diphenyl, di-aryl compounds and hydrogen pass into condenser 6, which is provided with regulated means for quickly cooling the vapors sufficiently to condense the diphenyl and such other compounds as are formed when the benzol vapors are heated. The diphenyl and other compounds together with some benzol are drawn off into a receiver 10, from which it flows into a still 11, from whence separation is effected by a condenser 12, in which the fractions are separated into high boiling compounds, collected in a tank 15, the intermediate boiling compounds into a tank 14; and the diphenyl into a tank 13. The benzol condensed with the diphenyl in condenser 6 is recondensed in the condenser 12 and passes to the receiving tank 8. The diphenyl and di-aryl compounds are then ready for use in whatever form is desired.

In order to make the process a cyclic operation, the benzol vapors and hydrogen from the condenser 6 pass into a condenser 7, where liquid benzol is collected and flows into a receiving tank 8, while the hydrogen is vented through a gasometer 16. The liquid benzol is returned by a pump 9 through benzol tank 2 to the constant level tank 3, and thence again through the cycle. As the benzol is converted according to the process described, additional benzol is admitted into the system from storage tank 1.

While I have described my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The herein described process for the production of diphenyl from benzol which comprises raising the temperature of a stream of benzol vapors in a preheating step until substantially all the stream is near the point where an appreciable conversion to diphenyl begins, then in a conversion step abruptly raising the preheated vapors in the stream to the optimum temperature range for conversion to diphenyl, and as soon as said vapors have attained said optimum temperature range, abruptly chilling them to a temperature below the diphenyl forming temperature, the vapors having a relatively accelerated motion through the conversion step.

2. The herein described process for the production of diphenyl from benzol which comprises raising the temperature of a stream of benzol vapors in a preheating step until the stream is uniformly at a temperature where an appreciable conversion to diphenyl begins, then in a conversion step abruptly raising the thus preheated vapors in the stream to the optimum temperature range for the conversion to diphenyl, and as soon as said vapors have attained said optimum temperature range, abruptly chilling them to a temperature below the diphenyl forming temperature, the vapors having their stream flow disturbed and accelerated in their passage through the conversion step.

3. The herein described process for the production of diphenyl from benzol which comprises raising the temperature of a stream of benzol vapors in a preheating step until the vapors are uniformly at a temperature below but near that at which an appreciable conversion to diphenyl begins, and then in a conversion step suddenly raising the preheated vapors in the stream to the optimum temperature range for the diphenyl reaction, and as soon as said vapors have attained said optimum temperature range, suddenly chilling them below the diphenyl forming temperature, the vapor stream having a relatively accelerated motion through the conversion step, the raise in temperature in the conversion step being accomplished by heat interchange with elements having a temperature within the optimum conversion temperature range.

4. The herein described process for the production of diphenyl from benzol which comprises raising the temperature of a stream of benzol vapors in a preheating step until the vapors are uniformly at a temperature below but near that at which an appreciable diphenyl reaction begins, then in a conversion step abruptly raising the preheated vapors in said stream to the optimum temperature range for the conversion to diphenyl, and as soon as said vapors have attained said optimum temperature range, abruptly chilling them to a temperature below the diphenyl forming temperature, the vapor stream having a relatively accelerated motion through the conversion step, the raise in temperature for the conversion step being accomplished by heat interchange with elements having a temperature within the said optimum conversion temperature range which are interposed in the path of the vapors to break up their stream flow in the conversion step.

5. The process of producing diphenyl which comprises preheating a stream of benzol vapors by heat exchange with heating elements having a maximum temperature but below that at which substantial quantities of diphenyl are formed until said vapors are uniformly near the maximum temperature of said elements, then passing the thus preheated vapor stream into contact with heating means having a temperature within the optimum temperature range for the conversion of benzol to diphenyl and so interposed in the path of the vapor stream as to disturb and cause an acceleration of its flow and to uniformly heat it while in contact with said heating means, and chilling said vapors to a temperature substantially below that at which diphenyl is formed as soon as they have attained a uniform temperature near that of said heating means.

6. The process of producing diphenyl which comprises preheating a stream of benzol vapors by heat exchange with heating elements having a maximum temperature of from 600° C. to 650° C. until said vapors are uniformly near the temperature of said elements, then passing the thus preheated vapor stream into contact with heating means having a temperature of from 700° C. to to 800° C. and so interposed in the path of the vapor stream as to disturb and cause an acceleration of its flow and to uniformly heat it while in contact with said heating means, and abruptly chilling said vapors to a temperature substantially below 700° C. as soon as they have attained a uniform temperature approaching that of said heating means.

7. In the process of producing diphenyl by the pyrolysis of benzol in which the benzol vapors are uniformly heated to a temperature of from 700° C. to 800° C. and then cooled to a temperature substantially below 700° C., the improvement which comprises shortening the period during which the vapors are at diphenyl forming temperature by subjecting the vapors to the cooling step as soon as they have attained a temperature of from 700° C. to 800° C.

8. In the process of making diphenyl by heating benzol vapors to diphenyl forming temperatures and then cooling them, the improvement which comprises shortening the period during which the vapors are at diphenyl forming temperatures by first uniformly preheating the vapors to a temperature below but near diphenyl forming temperature, then abruptly and uniformly heating to raise them to rapid diphenyl forming temperature, and subjecting the vapors to cooling below diphenyl forming temperature as soon as they attain rapid diphenyl forming temperature.

9. The process of producing diphenyl which comprises raising the temperature of a stream of benzol vapors in a preheating step until they are uniformly near the point where an appreciable conversion to diphenyl begins, then in a conversion step abruptly passing the stream into contact with a metallic heating medium having a temperature within the optimum range for the formation of diphenyl, and chilling the stream of benzol vapor to a temperature below diphenyl forming temperature as soon as they attain a temperature near that of the heating medium and before carbon and tar formation begins to an extent that would interfere with the continuous operation of the process.

10. The process of producing diphenyl which comprises preheating a stream of benzol vapors until substantially all the stream is uniformly within a temperature range of from 600° C. to 650° C. by heat interchange with elements heated to a temperature within said range, and then passing said vapor stream thus preheated in such heat exchange relation with a heating means maintained at a temperature above 700° C. and below 800° C. as to heat abruptly the vapors to a uniform temperature near to that of the heating means to decompose them and form diphenyl, said stream in the decomposition stage having such a velocity as to minimize the formation of tar and carbon to such an extent that they do not interfere with the continuous operation of the process, and abruptly cooling the vapors to stop the decomposition as soon as they attain a temperature near that of the heating means.

11. The process of producing diphenyl which comprises preheating a stream of benzol vapors by heat interchange with elements heated to a temperature range of from 600° C. to 650° C. until the temperature of said stream of vapors is uniform and near that of the heating elements, then passing said vapor stream thus preheated into contact with a heating means heated to a temperature range of from 700° C. to 800° C. and having a heating surface such as abruptly to heat the vapors to a uniform temperature near that of the heating elements and form diphenyl, causing said stream to flow while in contact with said heating means at such a velocity that side reactions to any appreciable extent are prevented, and abruptly cooling the vapors to a temperature substantially below 700° C. as soon as they attain a temperature near that of said heating means.

12. In the process of making diphenyl by heating benzol vapors to diphenyl forming temperatures and then cooling them, the improvement which comprises shortening the period during which the vapors are in contact with heating elements at diphenyl forming temperatures by first preheating the vapors to a uniform temperature of from 600° C. to 650° C. by contact with heating elements with a maximum temperature around 650° C., then abruptly heating the vapors to a uniform temperature of from 700° C. to 800° C., and subjecting the vapors to cooling as soon as they attain a temperature of from 700° C. to 800° C.

13. The process of producing diphenyl which comprises raising the temperature of benzol vapors to a uniform temperature at which benzol begins to pyrolize, then in a conversion step abruptly raising the temperature of the vapors to a uniform temperature within the optimum range for the substantial pyrolysis thereof, and as soon as the vapors attain said optimum temperature then chilling the vapors to a temperature below pyrolysis temperature.

14. A process of producing diphenyl which comprises heating benzol vapors to a uniform temperature within the optimum range for the formation of diphenyl, and chilling the vapors to a temperature below diphenyl forming temperature as soon as said vapors attain diphenyl forming temperature and before the formation of tar and carbon begins to an extent that would interfere with the continuity of the process.

15. In the process of producing diphenyl by the pyrolysis of benzol in which the benzol vapors are heated to diphenyl forming temperatures and then cooled to a temperature below diphenyl forming temperature, the improvement which comprises heating the vapors to a uniform temperature at which diphenyl is formed and shortening the period during which the vapors are at said temperature by subjecting them to the cooling step as soon as they have attained diphenyl forming temperature.

JOHN N. CAROTHERS.